Patented Aug. 10, 1954

2,686,157

UNITED STATES PATENT OFFICE 2,686,157

FLUORESCENT COATING COMPOSITION AND PROCESS

Shannon Jones, East Cleveland, Ohio, assignor to General Electric Company, a corporation of New York No Drawing. Application March 18, 1952, Serial No. 277,279

7 Claims. (Cl. 252—301.3)

My invention relates to fluorescent coating compositions and methods, and is particularly applicable to the coating of tubular fluorescent lamp envelopes.

It is an object of my invention generally to improve the appearance and reduce manufacturing shrinkage of fluorescent lamps without impairing lamp quality.

Coating compositions generally employed in the fluorescent lamp art comprise a suspension of finely divided fluorescent material or phosphor in a lacquer comprising a cellulosic binder and a solvent therefor. A typical binder composition, hereinafter designated binder B, may consist of about ½ per cent dynamite-grade nitrocellulose in a mixture of 60 volume per cent butyl acetate plus 40 volume per cent naphtha. The proportion of nitrocellulose is expressed as the ratio W/V wherein W represents weight in grams, for instance, and V represents volume in milliliters (or cubic centimeters), for instance. The lacquer may be thinned to the proper viscosity for application to the envelope by a thinner, hereinafter designated thinner T, and composed of 50 per cent butyl acetate and 50 per cent naphtha, by volume. The suspension is applied to the inner surface of a lamp envelope by flowing it thereon in any suitable manner, after which it is dried and then fired at a temperature of the order of 400–600° C. to burn out the binder.

According to the present invention, I have found that the addition of a mixture of water and a coupling agent to the cellulosic lacquer employed in milling lamp phosphors provides an improved milling medium. An improved lacquer which has given particularly good results may be composed of about 9 parts, by volume, of binder such as that designated above as binder B, admixed with 1 part, by volume, of a mixture of water and coupling agent in proportions of 8 parts, by volume, of water and 92 parts, by volume, as "Cellosolve" as the coupling agent. "Cellosolve" is the mono-ethyl ether of ethylene glycol.

The improved lacquer tends to give a faster dispersion of the phosphors and a smoother coating appearance. With the improved formula certain appearance defects in the coated envelope are minimized. In the absence of the water and coupling agent, the viscosity of the liquid part of the suspension must be higher than with the new formula in order to prevent the appearance of defects termed "chevrons" and arising from undispersed grains in the suspension. Thus, less liquids are required with the improved formula to give the proper coating weight and a saving in solvent cost is obtained.

In the improved lacquer I believe water is the active dispersing agent. The addition to the lacquer of 10 per cent of its volume of a glycolether (Cellosolve) by itself did not improve the dispersing power of the lacquer, nor did 0.2 per cent of water which was the limit of solubility of water in the standard lacquer. It was necessary to add the glycol-ether, which is completely miscible with water and with the standard nitrocellulose lacquer, in order to permit the addition of sufficient water to be effective as a dispersing agent. It seems probable that with the faster dispersion less damage is done to the phosphor by way of cracking crystals during the milling. The milling time may usually be shortened when using the improved binder.

Improved dispersion when using the new binder has been obtained in miling phosphors of various compositions such as helophosphates (as disclosed and claimed in Patent 2,488,733, McKeag et al.), calcium silicate, magnesium tungstate and cadmium borate. The phosphors are of fine particle size which may range, in median radius, from slightly less than one micron to about 5 microns depending upon the composition and method of preparation of the phosphors.

The formula given above is not critical; more or less water or coupling agent or both may be used within fairly wide limits and the improvement will still be obtained, although I have obtained good results where the water amounts to about 1 per cent, by volume, of the lacquer.

The solvents generally employed for the cellulosic binder are not substantially miscible with water but are preferred from the standpoint of cost, ready availability, moderate drying rate, etc. In accordance with my invention, therefore, I add the water together with a coupling agent which is miscible with water and with the solvent. Preferably, the coupling agent itself is also a good solvent for the cellulosic binder. However, I may use a coupling agent which is not a solvent for the cellulosic binder providing that the nonsolvent does not remain, after the true solvent has evaporated, in sufficient quantity so that the cellulosic material precipitates out in the nonsolvent.

I may employ cellulosic binders other than nitrocellulose and including, for example, cellulose acetate, ethyl cellulose, cellulose butyrate and mixed esters such as cellulose acetate butyrate. Solvents other than butyl acetate plus naphtha may include, for instance, amyl acetate, nitropropane, methyl ethyl ketone, methyl isobutyl ketone, and mixtures of toluene and alcohol. If some of these solvents were used without the diluent naphtha, it might be possible to add sufficient water without using a coupler. For example, butyl acetate (and presumably a nitrocellulose solution in butyl acetate) dissolves 1.2 per cent water. The presence of naphtha reduces the water tolerance of binder B.

I may employ phosphor-to-binder ratios preferably in the range of about 1:1 to 1:2 (W/V), the binder preferably having a viscosity at 25° C. giving a flow between about 45 and 60 seconds through a Parlin #7 viscosity cup. (60 seconds=78 centistokes.)

The water tolerance of a mixture of binder and thinner, such as binder B and thinner T referred to above, may be limited by either of two conditions. First, the limit of the solubility of water in the solvents may be reached, beyond which additional water shaken with the solvents produces turbidity. Secondly, the water may be soluble in the organic solvents beyond the proportion at which it precipitates nitrocellulose from the solution; this effect also produces turbidity in the solution. However, it has been my experience generally that it has been the solvent-water miscibility which usually has been increased by the addition of a coupling agent.

The following is a list of various coupling agents and the effect produced thereby. In general there is some small amount of uncertainty as to the exact amount of water at which turbidity develops and remains, but this uncertainty is small compared with the differences between coupling agents.

| Volume of "Binder B" (ml.) | Volume of "Thinner T" (ml.) | Coupler Used | Volume of Coupler (ml.) | Max. Solubility of water (ml.) |
|---|---|---|---|---|
| 10 | 90 | None | | .26–.39 |
| 10 | 90 | "Cellosolve" | 10 | 1.04–1.17 |
| 10 | 90 | Ethyl lactate | 10 | .65–1.04 |
| 25 | 75 | Secondary butyl alcohol | 10 | .6–1.0 |
| 25 | 75 | Tertiary butyl alcohol | 10 | .8 is miscible. |
| 25 | 75 | Diacetone alsohol | 5 | .5–.6 |
| 25 | 75 | do | 10 | .6–.7 |
| 25 | 75 | 1-acetyl 2-hydroxy propane | 5 | 1.4–1.8 |
| 25 | 75 | 2-methyl 2,4 pentanediol | 5 | 0.6–1.0 |
| 25 | 75 | do | 10 | 1.0–1.6 |
| 25 | 75 | Di-ethyl "Carbitol" | 5 | 0.5 |
| 25 | 75 | do | 10 | 0.5 |
| 24 | 71 | Acetone | 10 | .60–.85 |
| 24 | 71 | "Cellosolve" acetate | 10 | .4–.5 |
| 24 | 71 | Diacetone alcohol | 10 | .6–.7 |
| 24 | 71 | Acetonyl acetone | 10 | .65–.75 |
| 24 | 71 | Butyl "Carbitol" | 10 | .60–.75 |
| 24 | 71 | Isopropyl alcohol | 10 | 1.3 |
| 24 | 71 | Methyl lactate | 10 | 1.1–1.15 |
| 24 | 71 | Butyl lactate | 10 | .5–.65 |
| 24 | 71 | Secondary butyl alcohol | 10 | 0.9 |
| 24 | 71 | Butyl "Cellosolve" acetate | 10 | .5–.6 |
| 24 | 71 | Normal butyl alcohol | 10 | 1.1–1.2 |
| 24 | 71 | Tertiary amyl alcohol | 10 | .8–.9 |
| 24 | 71 | Propylene glycol | 10 | 0.8 |
| 24 | 71 | "Cellosolve" | 10 | 1.3–1.35 |
| 24 | 71 | Butyl "Cellosolve" | 10 | .85–1.0 |

"Carbitol," referred to in the above table, is di-ethylene glycol mono-ethyl ether.

From the above table it will be seen that "Cellosolve" is one of the best coupling agents. It is also desirable from the standpoint of other considerations such as availability, evaporation rate, cost, toxicity and solvent power for nitrocellulose.

By way of example only, the following is a detailed description of a coating composition comprising my invention. The binder designated as binder B may be prepared by thoroughly dissolving 25 pounds of alcohol-wet dynamite-grade nitrocellulose in a mixture of 200 gallons of naphtha and 300 gallons of butyl acetate. The viscosity of the mixture is measured using a Parlin #7 cup, and if necessary a solution composed of 40 per cent naphtha and 60 per cent butyl acetate is added until the viscosity measures 45 to 60 seconds at 25° C. A Cellosolve-water mixture is prepared containing, by volume, 92 per cent Cellosolve and 8 per cent de-ionized water. The materials are then milled in a 100 gallon ball mill by first introducing 90 kilograms of the powdered phosphor, 48.6 liters of binder B and 5.4 liters of Cellosolve-water mixture. This mixture is milled for the desired length of time, which may be of the order of five hours, and then there is added to the mill 32.4 liters of binder B, 3.6 liters of Cellosolve-water mixture and sufficient of thinner T solution to obtain the desired viscosity, the milling being continued for about 15 minutes. This mixture is then applied to the inner surface of the tubular glass envelope, and subsequently dried and fired to burn out the binder.

In accordance with another milling procedure, there was first introduced into the mill 90 kilograms of phosphor and 54 liters of binder B which was milled for six hours. There was then added to the mill 36 liters of binder B, 9 liters of Cellosolve-water mixture and 40 liters of thinner T and the milling continued for 15 minutes.

In another method the lacquer may be made up originally to contain the equivalent of 90 parts binder B plus 10 parts Cellosolve-water plus sufficient extra nitrocellulose to give the standard binder viscosity.

The addition of water and coupling agent was particularly effective, as regards minimizing the appearance defect of chevrons, where the phosphor-to-binder ratio was in the range of about 1:1 to 1:1.5.

What I claim as new and desire to secure by Letters Patent of the United States is:

1. In a fluorescent coating comprising a suspension of finely divided fluorescent material in a lacquer comprising a cellulosic binder and a solvent therefor which is not substantially miscible with water, the improvement which comprises the presence of a small amount of about 1% by volume of the lacquer of water together with a coupling agent which is miscible with the water and the said solvent.

2. In a fluorescent coating composition comprising a suspension of finely divided fluorescent material in a lacquer comprising a cellulosic binder and a solvent therefor which is not substantially miscible with water, the improvement which comprises the presence of a small amount of about 1% by volume of the lacquer of water together with a coupling agent comprising a glycol-ether which is miscible with the water and the said solvent.

3. In a fluorescent coating composition comprising a suspension of finely divided fluorescent material in a lacquer comprising a cellulosic binder and a solvent therefor which is not substantially miscible with water, the improvement which comprises the presence of a small amount of about 1% by volume of the lacquer of water together with a coupling agent comprising mono-ethyl ether of ethylene glycol which is miscible with the water and the said solvent.

4. In a fluorescent coating composition comprising a suspension of finely divided fluorescent material in a lacquer comprising nitrocellulose binder and a solvent therefor comprising an alkyl acetate which is not substantially miscible with water, the improvement which comprises the presence of a small amount of about 1% by volume of the lacquer of water together with a coupling agent consisting of mono-ethyl ether of ethylene glycol.

5. A fluorescent coating composition comprising a suspension of finely divided phosphor material in a binder comprising nitrocellulose dissolved in butyl acetate and naphtha to which has been added water and a coupling agent consisting of mono-ethyl ether of ethylene glycol, the phosphor-to-binder ratio being in the range of about 1:1 to 1:2 (W/V), the binder consisting of about ½ per cent (W/V) dynamite-grade nitrocellulose dissolved in a mixture of about 60 volume per cent butyl acetate and 40 volume per cent naphtha, and the ratio, by volume, of binder to water plus coupling agent being about 9 to 1 wherein the ratio, by volume, of water to coupling agent is about 8 to 92.

6. The process of coating a glass support with finely divided fluorescent material which comprises preparing a suspension of the fluorescent material in a lacquer comprising a cellulosic binder and a solvent therefor which is not substantially miscible with water and further including a small amount of about 1% by volume of the lacquer of water together with a coupling agent which is miscible with the water and said solvent, applying a coating of said suspension to a surface of said support, drying the coating, and subsequently heating the support to an elevated temperature sufficient to burn out the said binder.

7. The process of coating a glass support with finely divided fluorescent material which comprises preparing a suspension of the fluorescent material in a lacquer comprising a cellulosic binder and a solvent therefor which is not substantially miscible with water and further including a small amount of about 1% by volume of the lacquer of water together with a coupling agent consisting of mono-ethyl ether of ethylene glycol which is miscible with the water and said solvent, applying a coating of said suspension to a surface of said support, drying the coating, and subsequently heating the support to an elevated temperature sufficient to burn out the said binder.

References Cited in the file of this patent

UNITED STATES PATENTS

| Number | Name | Date |
|---|---|---|
| 2,279,459 | Harris | Apr. 14, 1942 |
| 2,310,866 | Pitman | Feb. 3, 1943 |
| 2,337,524 | Michael | Dec. 21, 1943 |
| 2,510,166 | Baruch | June 6, 1950 |

OTHER REFERENCES

Synthetic Organic Chemicals, June 1, 1942.
Condensed Chem. Dictionary, 1950.